(12) United States Patent
Woerz et al.

(10) Patent No.: US 9,064,228 B2
(45) Date of Patent: Jun. 23, 2015

(54) METHODS AND DEVICES FOR CLASSIFYING OBJECTS

(75) Inventors: Stephen Woerz, Florissant, MO (US); Frank Weber, Oakville, MO (US); Antonio Mallare, Gardena, CA (US)

(73) Assignee: Nestec SA, Vevey (CH)

( * ) Notice: Subject to any disclaimer, the term of this patent is extended or adjusted under 35 U.S.C. 154(b) by 1 day.

(21) Appl. No.: 13/395,003

(22) PCT Filed: Sep. 2, 2010

(86) PCT No.: PCT/US2010/002441
§ 371 (c)(1), (2), (4) Date: Apr. 11, 2012

(87) PCT Pub. No.: WO2011/034563
PCT Pub. Date: Mar. 24, 2011

(65) Prior Publication Data
US 2012/0205435 A1    Aug. 16, 2012

Related U.S. Application Data

(60) Provisional application No. 61/276,796, filed on Sep. 16, 2009.

(51) Int. Cl.
*G06F 17/00* (2006.01)
*G06Q 10/08* (2012.01)
(52) U.S. Cl.
CPC .................................. *G06Q 10/087* (2013.01)
(58) Field of Classification Search
CPC ......... G06K 17/00; G06K 7/12; G06K 19/14; G06K 19/02

USPC .............. 235/375, 437, 462.01, 462.14, 468, 235/470, 475, 476
See application file for complete search history.

(56) References Cited

U.S. PATENT DOCUMENTS

| | | | | |
|---|---|---|---|---|
| 3,628,271 | A * | 12/1971 | Carrell et al. | 40/311 |
| 4,321,103 | A * | 3/1982 | Lindstrom et al. | 156/351 |
| 4,983,817 | A * | 1/1991 | Dolash et al. | 235/462.04 |
| 5,360,628 | A * | 11/1994 | Butland | 427/7 |
| 5,367,148 | A * | 11/1994 | Storch et al. | 235/375 |
| 5,407,081 | A  | 4/1995 | Oshino et al. | 209/538 |
| 5,427,029 | A * | 6/1995 | Dumke | 101/484 |
| 5,542,971 | A * | 8/1996 | Auslander et al. | 106/31.15 |
| 5,766,324 | A * | 6/1998 | Ikegaya et al. | 106/31.15 |
| 5,922,169 | A * | 7/1999 | Chodacki et al. | 156/521 |
| 6,097,427 | A * | 8/2000 | Dey et al. | 348/92 |
| 6,575,216 | B2 * | 6/2003 | Yang | 156/351 |
| 6,752,189 | B2 * | 6/2004 | Oldenburg et al. | 156/362 |
| 6,954,742 | B2 * | 10/2005 | Cordery et al. | 705/402 |
| 7,219,841 | B2 * | 5/2007 | Biss et al. | 235/462.25 |
| 7,232,070 | B2 * | 6/2007 | Craig | 235/462.01 |
| 7,372,366 | B2 * | 5/2008 | Lyon et al. | 340/572.8 |
| RE40,510 | E * | 9/2008 | Lasher et al. | 53/55 |

(Continued)

*Primary Examiner* — Paultep Savusdiphol
(74) *Attorney, Agent, or Firm* — Julie M. Lappin; Aaron J. Morrow

(57) ABSTRACT

The invention provides methods for classifying an object by (a) at least partially coating at least one surface of the object with at least one barcode; (b) scanning the barcode with at least one corresponding barcode detector that is detectably compatible with a barcode of the type coated on the object; (c) determining whether the barcode is read by the barcode detector; and (d) classifying the object on the basis of at least one barcode not being read by the corresponding barcode detector.

17 Claims, 2 Drawing Sheets

(56) References Cited

U.S. PATENT DOCUMENTS

| | | | |
|---|---|---|---|
| 7,509,786 B2* | 3/2009 | Thatenhorst | 53/253 |
| 7,769,485 B2* | 8/2010 | Miller et al. | 700/224 |
| 8,215,540 B2* | 7/2012 | Szesko et al. | 235/375 |
| 8,262,842 B2* | 9/2012 | Szesko et al. | 156/297 |
| 2002/0040767 A1* | 4/2002 | Yang | 156/363 |
| 2004/0093312 A1* | 5/2004 | Cordery et al. | 705/401 |
| 2005/0274788 A1* | 12/2005 | Craig | 235/375 |
| 2006/0086794 A1* | 4/2006 | Knowles et al. | 235/454 |
| 2006/0255953 A1* | 11/2006 | Lyon et al. | 340/572.8 |
| 2007/0210164 A1* | 9/2007 | Conlon et al. | 235/462.01 |
| 2008/0128509 A1* | 6/2008 | Knowles et al. | 235/462.42 |
| 2008/0290168 A1* | 11/2008 | Sullivan et al. | 235/462.01 |
| 2009/0084713 A1* | 4/2009 | Miller et al. | 209/584 |
| 2009/0108074 A1* | 4/2009 | Vinogradov | 235/462.42 |
| 2009/0179072 A1* | 7/2009 | Szesko et al. | 235/375 |
| 2009/0242642 A1* | 10/2009 | Starling et al. | 235/462.01 |
| 2009/0255986 A1* | 10/2009 | Starling et al. | 235/375 |
| 2009/0266877 A1* | 10/2009 | Vonwiller et al. | 235/375 |

* cited by examiner

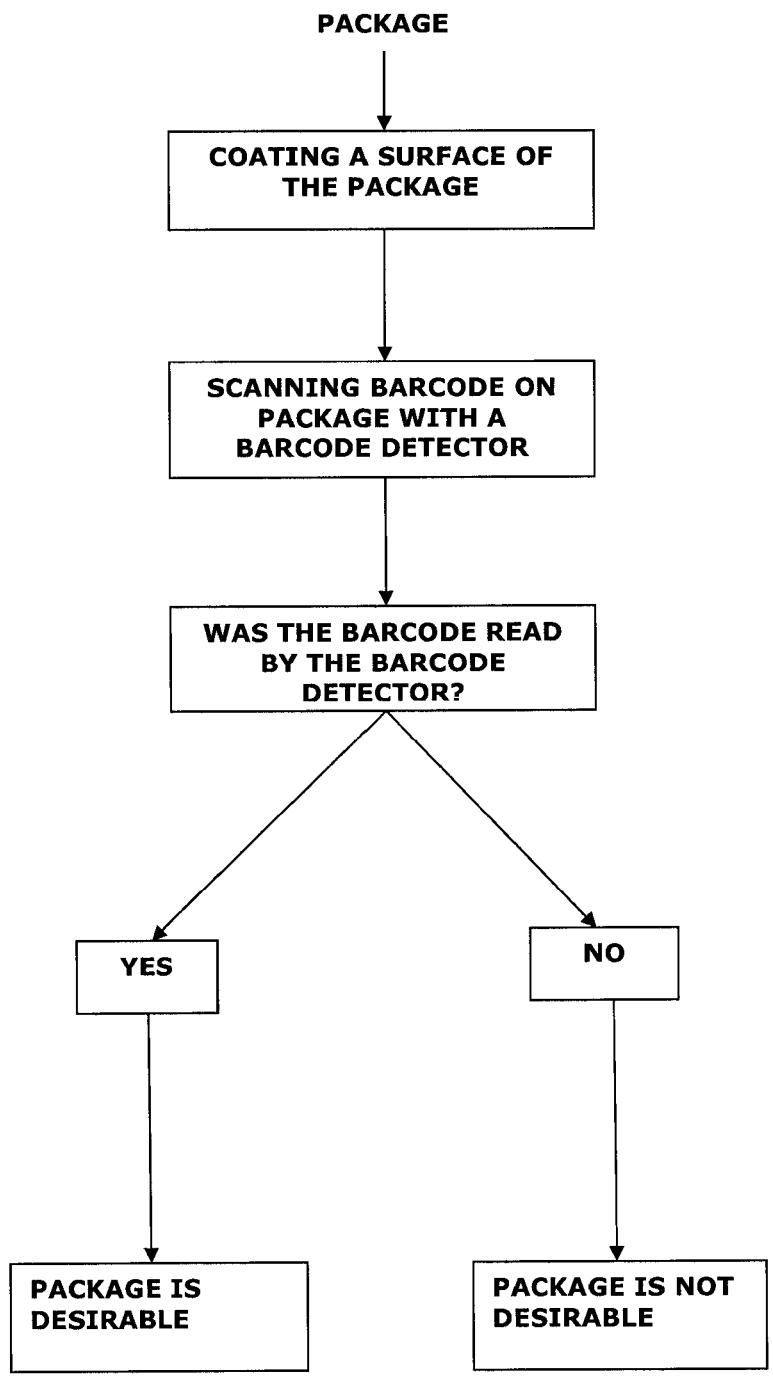

METHODS AND DEVICES FOR CLASSIFYING OBJECTS

CROSS REFERENCE TO RELATED APPLICATIONS

This application is a national stage application under 35 U.S.C. §371 of PCT/US2010/002441 filed Sep. 2, 2010, which claims priority to U.S. Provisional Application Ser. No. 61/276,796 filed Sep. 16, 2009, the disclosures of which are incorporated herein by this reference.

BACKGROUND OF THE INVENTION

1. Field of the Invention

The invention relates generally to methods and devices for classifying objects and particularly to methods and devices for classifying objects using barcodes.

2. Description of Related Art

Methods for classifying objects are known in the art. Such methods include classifying an object as different from another object based on one or more particular characteristics. For example, food products are classified based on their calorie content, taste, type, size, price, color, and the like. One method for classifying an object involves using barcodes on the object, its container, or a label associated with the object or its container. Such barcodes are read by a barcode detector, the information coded into the barcode is collected by the detector, and the information is processed to classify the object, e.g., determine the object type or identity for an inventory. Generally, barcodes and barcode detectors are used to collect information and process information. These methods rely on the detector reading the barcode to classify the object; they do not consider the lack of readability of the barcode to classify the object.

Similarly, methods for detecting products defects are known in the art. Such methods include visual inspection, infrared detection, taste, sound, thermal image subtraction, vacuum decay leak tests, physical inspection, and spectroscopy. For example, U.S. Pat. No. 5,032,727 discloses methods for detecting defects using thermal ratio analysis involving ratios of thermal data and their analysis including statistical analysis and employing image enhancement to aid decision. However, such methods are inadequate in many situations. For example, these methods often do not identify products with defects on the surface of the product or defects in a product container, e.g., a punctured container with leaky contents. While these known methods are useful, there is a need for novel methods and devices for classifying objects, particularly for classifying objects as defective and identifying objects that have been tampered with.

SUMMARY OF THE INVENTION

It is, therefore, an object of the invention to provide novel methods for classifying objects.

It is another object of the invention to provide novel methods for classifying objects as defective.

It is a further object of the invention to provide novel methods for classifying objects as tampered with.

It is another object of the invention to provide novel devices useful for classifying objects.

It is a further object to of the invention to provide objects suitable for classification using the methods and devices of the invention.

One or more of these or other objects are achieved by at least partially coating at least one surface of an object with at least one barcode; (b) scanning the barcode with at least one corresponding barcode detector that is detectably compatible with a barcode of the type coated on the object; (c) determining whether the barcode is read by the barcode detector; and (d) classifying the object on the basis of at least one barcode not being read by the corresponding barcode detector. In preferred embodiments, an object is classified as undesirable, defective, or tampered with if the barcode on the object cannot be read by the corresponding barcode detector. In more preferred embodiments, an object is classified as defective compared to a plurality of like objects when the barcode on the object cannot be read, e.g., identifying defective objects on a high-speed, automated production line.

Other and further objects, features, and advantages of the present invention will be readily apparent to those skilled in the art.

BRIEF DESCRIPTION OF THE DRAWINGS

FIG. 2 shows a schematic flowchart of a method of the present invention for classifying objects as defective or tampered with using barcodes.

DETAILED DESCRIPTION OF THE INVENTION

Definitions

Figure 1:
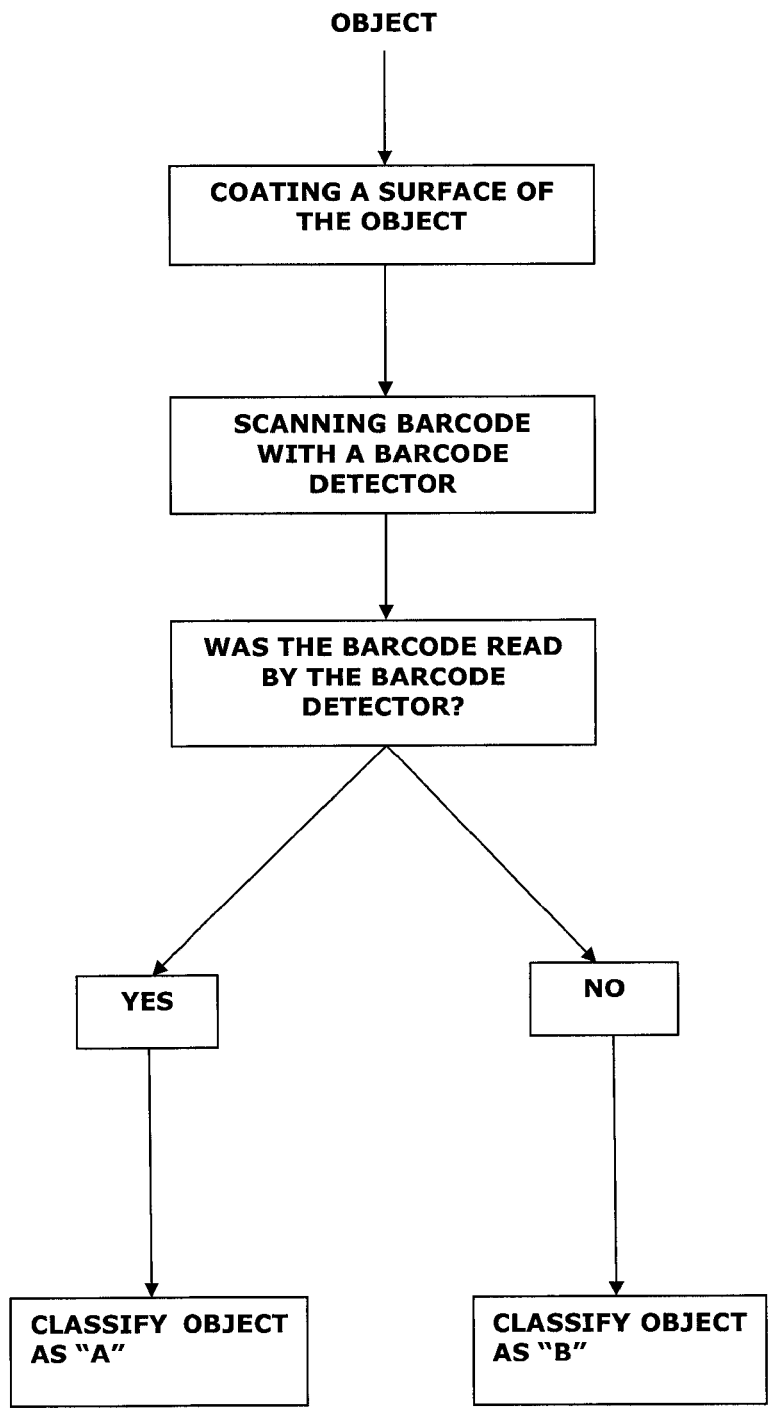
FIG. 1 shows a schematic flowchart of a method of the present invention for classifying objects using barcodes.

The term "visible" means capable of detection by the typical human eye without aid from any device or other means.

The term "invisible" means incapable of detection by the typical human eye without aid from any device or other means.

The term "coating" means imprinting, applying, or otherwise placing a barcode on an object such that it can be read by a barcode detector.

The term "defective" means imperfect in form or function.

The term "tampered with" means to render an object undesirable, harmful, or dangerous by altering its structure or composition.

As used herein, ranges are used herein in shorthand, so as to avoid having to list and describe each and every value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "an object", "a method", or "a device" includes a plurality of such "objects", "methods", or "devices." Similarly, the words "comprise", "comprises", and "comprising" are to be interpreted inclusively rather than exclusively. Likewise the terms "include", "including" and "or" should all be construed to be inclusive, unless such a construction is clearly prohibited from the context. Similarly, the term "examples," particularly when followed by a listing of terms, is merely exemplary and illustrative and should not be deemed to be exclusive or comprehensive.

The methods and compositions and other advances disclosed here are not limited to particular methodology, protocols, and reagents described herein because, as the skilled artisan will appreciate, they may vary. Further, the terminology used herein is for the purpose of describing particular embodiments only, and is not intended to, and does not, limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

The Invention

In one aspect, the invention provides methods for classifying an object. The methods comprise the steps of (a) at least partially coating at least one surface of the object with at least one barcode; (b) scanning the barcode with at least one corresponding barcode detector that is detectably compatible with a barcode of the type coated on the object; (c) determining whether the barcode is read by the barcode detector; and (d) classifying the object on the basis of at least one barcode not being read by the corresponding barcode detector.

In another aspect, the invention provides methods for classifying an object from a plurality of objects. The methods comprise the steps of (a) at least partially coating at least one surface of each object of the plurality of objects with at least one barcode; (b) scanning the at least one barcode on each object of the plurality of objects with at least one corresponding barcode detector that is detectably compatible with a barcode of the type coated on the object; (c) determining whether the barcode is read by the barcode detector; and (d) classifying the object in the plurality of objects on the basis of at least one barcode on the object not being read by the corresponding barcode detector.

The inventions are based upon the discovery that one or more barcodes on an object can be used to classify the object alone or from within a plurality of objects in a binary fashion, i.e., classifying those objects for which the barcode is read differently from those objects for which the barcode is not read.

In one embodiment, the methods are used to classify an object as desirable or undesirable depending on whether the barcode is read or not read, e.g., the object is undesirable if the barcode is not read. In another, the methods are used to classify an object as defective based on the readability of the barcode. In another, the methods are used to classify an object as tampered with based on the readability of the barcode. In some embodiments, the object is classified as desirable, not defective, or not tampered with if the barcode is not read. In preferred embodiments, the object is classified as undesirable, defective, or tampered with if the barcode is not read.

The barcodes useful in the invention can be any barcode capable of being read by a barcode detector compatible with the materials used to create the barcode. Inks and other materials suitable for creating barcodes are well known to skilled artisans. Any ink or other material that is invisible is suitable for creating invisible barcodes. For example, materials that are invisible but can be seen with an infrared detector can be used to coat a barcode onto an object. Then, the barcode cannot be seen by the consumer but can be used to classify an object according to the present invention. In a preferred embodiment, invisible barcodes are coated onto the majority of the surface area of an object. If the object leaks or is damaged during manufacture or handling, the barcode will be obscured by the leaking material and will not be read; the object will be classified as undesirable or defective. If the barcode is read, the object is classified as desirable. When the desirable object is made available to consumers, the invisible barcode will not affect the appearance of the object, even if the barcode is coated over the markings on the object.

In one embodiment, the invention provides a method for classifying an object using a one-dimensional barcode (1-D) barcode. The 1-D barcode can be visible or invisible. Preferably, the 1-D barcode is an invisible barcode. 1-D barcodes are well known in art.

In another embodiment, the invention provides a method for classifying an object using a two-dimensional (2-D) barcode. The 2-D barcode can be visible or invisible. Preferably, the 2-D barcode is an invisible barcode. 2-D barcodes are well known in art. For example, U.S. Pat. No. 7,478,746 discloses two-dimensional barcodes and methods of generating and decoding such codes.

In another embodiment, the invention provides a method for classifying an object using a three-dimensional (3-D) barcode. The 3-D barcode can be visible or invisible. Preferably, the 3-D barcode is an invisible barcode. 3-D barcodes are well known in art. For example, US20070125861 discloses barcodes with a third dimension of information.

For the invention, 1-D barcodes, 2-D barcodes, and 3-D barcodes are considered different types of barcodes. Further, if a visible 1-D barcode is present on an object, it is preferably accompanied with at least one other barcode on the object that is an invisible 1-D barcode, a 2-D barcode, or 3-D barcode.

In various embodiments, when the object comprises more than one barcode, the barcodes can all be of the same type, i.e., all barcodes can be 1-D, or all barcodes can be 2-D, or all barcodes can be 3-D. In another embodiment, at least two of the barcodes on an object are of different types. In another embodiment, all barcodes, whether of the same type or of different types, are visible. Generally, all barcodes on an object are not 1-D barcodes and visible barcodes. In another embodiment, all barcodes, whether of the same type or of different types, are invisible. Any combination of barcodes are included in the invention, whether visible, invisible, 1-D, 2-D, or 3-D.

At least one surface of the object is coated with a barcode. In one embodiment, more than one surface of the object is coated with a barcode. In another embodiment, all surfaces of the object are coated with a barcode.

A barcode can cover any amount of the surface area of an object as long as the code is readable by a corresponding detector under normal circumstances, e.g., when the object is not defective or tampered with. Generally, the barcode covers from about 1% to about 100% of the surface area of an object, preferably from about 5% to about 90%, most preferably from about 10% to about 80%. In various embodiments, the barcode covers any percentage between 1% and 100% of the surface area of a surface of the object. For example, the covered surface could be 5, 10, 20, 30, 40, 50, 60, 70, 80, or 90% or any number in between, in increments of about 1%, of the surface area of a surface of the object. The term "covered" is meant to include the possibly empty space between the barcode designs. If the barcode is invisible, it can be incorporated on the object over any existing markings associated with the object. Additionally or alternatively, the barcode can be incorporated under the markings associated with the object if the markings do not obscure the barcode and prevent it from being read. Additionally or alternatively, the barcode can be blended with the markings associated with the object in a manner that permits the barcode to be read in a desired manner.

In one embodiment, two or more barcodes readable by barcode detectors using different radiations are used to classify an object. This permits the barcodes to overlay each other, e.g., one barcode is visible and an invisible barcode is coated on top of the visible barcode. Similarly, two invisible barcodes can be coated so that one partially or completely overlays the other, each being detectable by a different barcode detector that detects a different radiation. Using different detectors that detect different radiations also gives the user flexibility in designing classification systems, e.g., to simultaneously classify objects based on different characteristics of the object.

The objects classified according to the invention are any objects capable of being coated with one or more barcodes as described herein and that can be classified if the barcode is or is not obscured or otherwise unreadable. The object can be almost anything, e.g., tools, toys, packages, boxes, shoes, sports equipment, and the like. In various embodiments, the objects are products, devices, containers, labels, or combinations thereof. For example, the object can be a can, bottle, pouch, box, bag, tray, tube, sleeve, plastic container, foil container, wax-coated paper container, or similar object. In preferred embodiments, the objects are objects manufactured using a production line, particularly a high-speed production line, wherein there is a need to identify defective objects without manual inspection. In one embodiment, the objects are containers such as plastic or foil packages or pouches containing foods or beverages, e.g., a wet pet food. Typically, the objects are sealed containers that are considered defective if the contents can leak from the container, e.g., a package of food, particularly moist or viscous foods. Many such objects can be identified by the skilled artisan.

When classifying an object from a plurality of objects, the objects can be the same or can be different. Preferably the objects are the same, e.g., identical packages containing the same product being manufactured on a production line.

In various embodiments, the barcodes are coated on a container or package that contains a product, e.g., a wet pet food or a beverage. In other embodiments, the barcodes are coated on a label to be affixed to the object, e.g., a label on a pouch or can of tuna fish. When the object is a label, the label itself may be defective, e.g., because is has been torn. The product with the label can be reprocessed to apply a readable label. Typically, the label is affixed to another object and that object is classified based upon the readability of the barcode on the label, e.g., the object is classified as defective because the label has been obscured when its contents leaked and obscured the barcode.

The barcode is detectable with any radiation suitable for use with barcodes. Generally, the radiation spectrum useful for detecting barcodes includes those wavelengths from radio waves to X-rays. Typically, the barcode is detectable with visible radiation or invisible radiation such as infrared, ultraviolet, or microwave radiation. When the barcode is invisible, the radiation used to detect the barcode is not a radiation detectable by the typical human eye.

The barcode detector is any standard detector known to skilled artisans. The detector can be fixed in a position such that it beams the radiation at one location through which the object is likely to pass. The detector may be movably fixed so that it can be moved in a new position when desirable. The detector can also be a hand-held detector. For example, U.S. Pat. No. 7,546,953 discloses a system for mounting a hand-held barcode scanner. U.S. Pat. No. 7,530,494 discloses a multi-functional scanner for reading barcodes. U.S. Pat. No. 7,380,719 discloses a barcode scanner with configurable video modes. These and other detectors or scanners known in the art permit the object to be classified to be placed vertically, horizontally, diagonally, or in any orientation.

FIG. 1 describes a schematic of a process for classifying objects. In step 1, an object is coated, at least partially, on at least one of its surfaces with at least one barcode. The object may be fully coated or substantially-fully coated. One or more surfaces of the object may be coated. Methods, devices, and techniques for imprinting, applying, incorporating, or otherwise coating barcodes onto an object are well known to skilled artisans.

In step 2, the object comprising the at least one barcode is brought under direct incidence of radiation from the source of the radiation (the barcode detector) that is detectably compatible with the barcode. The term "detectably compatible" means that the radiation detector is capable of reading the barcode. Stated another way, a barcode may inherently be read only by a certain type of radiation, e.g., a particular wavelength range of the radiation. Accordingly, an object is not classified in a particular way if the object's at least one barcode was not read because an incompatible barcode detector was used. Thus, in step 2, the object is exposed to such radiation. The barcode detector scans the barcode. There may be one or more barcode detectors placed in series or parallel to one another. By being placed in parallel is meant that the barcode detectors scan the object substantially simultaneously. For example, in one embodiment, the barcode detectors can be placed side-by-side or can be separated by an angle on a circumference around the axial direction of the movement of the object or a plurality of objects. However, this does not mean that if multiple barcode detectors are used, all barcode detectors must be placed equidistant from the object that is being classified. The barcode detectors can be placed equidistant from the object being classified, or the barcode detectors can be placed non-equidistant from the object being classified. In another example, two barcode detectors can be placed such that each detector scans a different surface of the object. Also, each barcode detector could be reading the same barcode or a different barcode on the object.

Assuming only one barcode detector scans the object, step 3 will address whether the barcode was read by the barcode detector or not, that is, step 3 considers a binary option. If the barcode was successfully read by the barcode detector, the object is classified as type "A;" and if the detector fails to read the barcode, the object is classified as type "B." "A" or "B" are predetermined classifications for the object. For example, classification "A" could mean the object is according to specifications of its making; classification "B" could mean that the object is not according to specifications and should be removed and repaired or discarded. Alternately, classification "A" could mean that the object should be sold at a higher price, while classification "B" could mean that the object is to be sold at a lower price. Stated another way, classification "A" and classification "B" could have diametrically opposite meanings. Classification "A" and classification "B" could also have meanings that are not diametrically opposite, but different. The underlying criterion is that classification "A" and classification "B" must have different meanings from each other. For example, an intact container with no defects would be classified as A; a container with a defect that permits its contents to leak and obscure the barcode would be classified as B.

In preferred embodiments, the methods are useful for classifying an object as defective or tampered with, alone or from within a plurality of objects, e.g., identifying defective objects on a product or packaging production line. For example, a barcode can be placed on a sealed container so that it is affected if the container is opened. If the container is opened and reclosed, the barcode will likely be misaligned and therefore unreadable. When the barcode is scanned, the barcode will not be read. As a result, the container is classified as tampered with. This is useful for identifying products that have been tampered with at the point of sale, e.g., an over-the-counter medication or a food product. In a preferred embodiment, an invisible 2-D bar is coated onto an over-the-counter medication container. The barcode is scanned at the checkout counter. If the barcode is unreadable, the container is classified as tampered with and not sold to the consumer.

In one embodiment, the methods are used for identifying defective products or product containers from a plurality of products or product containers, e.g., defective food containers on a continuous production line. Specifically, the invention provides methods for detecting defects such as punctures, tears, wrinkles, holes, or other such aberrations on a container such as a package that would impede reading of a barcode on the container. The invention is particularly useful for detecting defective containers when the container contents have leaked from the container and prevented the barcode from being read. However, the term "defective" in this context means lack of readability of a barcode on a container by its corresponding barcode detector. Often, these defects indicate that the container will be difficult to handle or undesirable in appearance or that the container contents are or will become unusable, e.g., spoiled.

A typical method of this embodiment comprises the steps of (a) at least partially coating at least one surface of each container from the plurality of containers with at least one barcode; (b) scanning the at least one barcode on each container with at least one corresponding barcode detector that is detectably compatible with a barcode of a type applied to the container; (c) identifying any container in the plurality of containers that possesses a barcode that is not read by the corresponding barcode detector; and, optionally, (d) separating the identified container from the plurality of containers. Typically, the container is a package containing a product, e.g., a food such as a pet food or a beverage such as a pouch of juice. This embodiment is based upon the discovery that a barcode on the package can be used to evaluate a package for defects. When the barcode can be read, the package is deemed to have no defects. When the barcode cannot be read, the package is deemed to be defective. For example, if a package with a barcode containing a liquid is defective, the liquid leaks from the package and obscures part or all of the barcode. When an attempt is made to read the barcode, the barcode will be unreadable. The package is then deemed defective. It can then be discarded, reviewed further and then discarded, or reviewed further and then reused, e.g., reinserted into a product line. The same rationale applies to packages or other objects that have been tampered with. The barcode may be visible and/or invisible and may be a 1-D, 2-D, or a 3-D barcode as described herein. Similarly, the barcode covers the object as described herein. In various embodiments, the barcode covers (1) the entire package; (2) one side of the package; (3) a portion of one side of the package, or (4) only a portion that is statistically likely to contain a defect or to have been tampered with, e.g., a cap, a wear line, or tear line.

In one embodiment, the method is used for identifying a defective package in a plurality of packages, e.g., packages containing liquid or viscous products such as milk, beverages, gravy, or wet pet foods. In this embodiment, the method comprises the steps of: (a) at least partially coating at least one surface of each package from the plurality of packages with at least one barcode; (b) scanning the at least one barcode on each package with at least one corresponding barcode detector that is detectably compatible with a barcode of a type applied to the package; (c) identifying any package in the plurality of packages that possesses a barcode that is not read by the corresponding barcode detector; and, optionally, (d) separating the identified package from the plurality of packages.

Generally, the method is accomplished using one or more devices for identifying a defective package in a plurality of packages on a continuous production line, and through the use of a package that is coated with at least one barcode that, when scanned with a corresponding barcode detector, is not read if there is a defect in the package.

In one embodiment, the barcode is placed in close proximity to the area of the package where the package will be opened by the consumer. In another, the barcode is placed in close proximity to one or more seams where the package was formed during production. In general, packages are more likely to be defective around seams or where the package will be opened. The same rationale applies to any similar object.

FIG. 2 describes a schematic of the process for identifying a defective product. In step 1, a package is coated, at least partially, on at least one of its surfaces with at least one barcode. The package could be fully coated or substantially-fully coated. One or more surfaces of the package may be coated.

In step 2, the package comprising the at least one barcode is brought under direct incidence of radiation from the source of the radiation (the barcode detector) that is detectably compatible with the barcode. Stated another way, a barcode may be read only by certain type of radiation (for example, a particular wavelength range of the radiation). Thus, the package is exposed to such radiation. The barcode detector scans the barcode on the package. There may be one or more barcode detectors placed in series or parallel to one another. By being placed in parallel is meant that the barcode detectors scan the package substantially simultaneously. For example, in one embodiment, the barcode detectors could be placed side-by-side or could be separated by an angle on a circumference around the axial direction of the movement of the plurality of packages. However, this does not mean that if multiple barcode detectors are used, all barcode detectors must be placed equidistant from the package that is being classified. The barcode detectors could be placed equidistant from the package being classified, or the barcode detectors could be placed non-equidistant from the package being classified. In another example, two barcode detectors could be placed in such a manner that each detector scans a different surface of the package. Also, each barcode detector could be reading the same barcode or a different barcode on the package.

Assuming only one barcode detector scans the package, step 3 will address whether the barcode was read by the barcode detector or not, that is, step 3 considers a binary option: if the barcode was successfully read by the barcode detector, the package is considered as desirable and likely without any defects; and on the other hand, if the detector fails to read the barcode, the package is deemed undesirable. It is likely that the barcode on the package was not read because a defect was present on the package. In reality, a defect may or may not be present. However, if the barcode on the package is not read, it is much more likely that a defect is present on the package. Stated another way, by the process of the present invention, it is possible that all defects may not be identified, and at the same time, all packages that are identified as undesirable, may not have a defect.

The methods of the invention are used classify an object in a binary fashion based the readability or unreadability of the barcode. However, the barcode itself may contain any type of information that is useful, e.g., the type of object, the price of an object, the manufacturing date of an object, the expiration date for an object, the origin of the object, and the like.

In another aspect, the invention provides a device suitable for classifying an object from a plurality of objects. The device comprises (a) a continuous production line for the plurality of objects; (b) at least one barcode detector attached to the continuous production line such that radiation from the at least one barcode detector is incident on at least one object of the plurality of objects on the continuous production line; and (c) at least one of the following components: (i) a remover component for removing an object that is not read by the at least one barcode detector from the plurality of objects; (ii) an inspection component for inspecting the object not read by the at least one barcode, for identifying a defect; (iii) a discarding component for discarding the object of item (ii); (iv) a reprocessing component for reprocessing the object of item (ii) into the object on continuous production line; and (v) a reinserting component for reinserting the object of item (ii) into the continuous production line. In a preferred embodiment, the objects are objects, preferably objects containing a food such as wet pet food. In one embodiment, the device is incorporated into an object production line. In another, the production line is an automated and/or high-speed production line.

In another aspect, the invention provides an object suitable for classification using barcodes. The object comprises one or more invisible barcodes as described herein. In one embodiment, the objects further comprise one or more visible barcodes as described herein. In various embodiments, the objects are products, devices, containers, labels, or combinations thereof as described herein. In preferred embodiments, the object is a package containing a product, e.g., a liquid or viscous product. In a preferred embodiment, the object is a container such as a package or pouch containing wet pet food. Wet pet food generally has a viscous gravy or similar product that leaks from the container if the container is sealed improperly or inadvertently punctured. The leaked gravy obscures all or a portion of the barcode. If the barcode covers the majority of the package containing the wet pet food, any leak is likely to obscure the barcode, prevent the barcode from being read properly, and make classifying the package as defective very likely.

In another aspect, the invention provides one or more objects classified using the methods or devices of the invention.

In another aspect, the invention provides a means for communicating information about or instructions for one or more of (1) classifying an object by (a) at least partially coating at least one surface of the object with at least one barcode, (b) scanning the barcode with at least one corresponding barcode detector that is detectably compatible with a barcode of the type coated on the object, (c) determining whether the barcode is read by the barcode detector, and (d) classifying the object on the basis of at least one barcode not being read by the corresponding barcode detector; and (2) classifying an object from a plurality of objects by (a) at least partially coating at least one surface of each object of the plurality of objects with at least one barcode, (b) scanning the at least one barcode on each object of the plurality of objects with at least one corresponding barcode detector that is detectably compatible with a barcode of the type coated on the object, (c) determining whether the barcode is read by the barcode detector, and (d) classifying the object in the plurality of objects on the basis of at least one barcode on the object not being read by the corresponding barcode detector. The means comprises a document, digital storage media, optical storage media, audio presentation, or visual display containing the information or instructions. In certain embodiments, the communication means is a displayed web site, visual display, kiosk, brochure, product label, package insert, advertisement, handout, public announcement, audiotape, videotape, DVD, CD-ROM, computer readable chip, computer readable card, computer readable disk, computer memory, or combination thereof containing such information or instructions. Useful information includes one or more of (1) methods and techniques for applying invisible barcodes to objects, (2) types and characteristics of barcodes, particularly invisible barcodes, and (3) contact information to use if there are questions about the invention and its use. Useful instructions include how to use invisible barcodes on production lines.

EXAMPLES

The invention can be further illustrated by the following examples, although it will be understood that these examples are included merely for purposes of illustration and are not intended to limit the scope of the invention unless otherwise specifically indicated.

Example 1

To determine if objects that were defective or had been tampered with could be classified when compared to objects that were not defective or had not been tampered with, ten (10) pouches were printed with a 2-D barcode over substantially the entire surface of the pouch. The 2-D barcodes were not visible to the human eye; the 2-D barcodes were visible under black light. Defects (or tampers) in the form of holes, wrinkles, cuts, or product leakages were created as follows:

2 pouches were unaltered;
 2 pouches contained a cut of about 0.5 inches in length;
 2 pouches contained a hole of about 0.1 inches in diameter;
 2 pouches contained product from the pouch that covered a spot of about 0.1 inches in diameter; and
 2 pouches contained a wrinkle that was about 1 to 3 inches in length.

All pouches were scanned using the appropriate barcode reader. The results are shown in Table 1.

TABLE 1

| Pouch | Reading |
| --- | --- |
| Unaltered | Read |
| Cut | Unread |
| Hole | Unread |
| Product Leak | Unread |
| Wrinkle | Unread |

Referring to Table 1, the results show that barcodes can be used to classify objects in general and that barcodes can be used to classify objects as defective or tampered with based upon the readability or unreadability of the barcode.

In the specification, there have been disclosed typical preferred embodiments of the invention. Although specific terms are employed, they are used in a generic and descriptive sense only and not for purposes of limitation. The scope of the invention is set forth in the claims. Obviously many modifications and variations of the invention are possible in light of the above teachings. It is therefore to be understood that within the scope of the appended claims, the invention may be practiced otherwise than as specifically described.

What is claimed is:

1. A method for classifying an object having a surface area that is the total area of the exterior surfaces of the object, comprising the steps of:
    (a) coating at least 50% of the surface area of the object with barcodes, the barcodes are coated on the object over existing markings on the object and comprise a first barcode that is invisible and overlays a second barcode at least partially, the first and second barcodes are readable using a different radiation wavelength relative to each other, each radiation wavelength selected from a spectrum of wavelengths from radio waves to X-rays;
    (b) scanning the barcodes with at least one corresponding barcode detector that is detectably compatible with a barcode of the type coated on the object;
    (c) determining whether one or more of the barcodes are read by the barcode detector; and
    (d) classifying the object as leaking when the first barcode on the object is not read by the corresponding barcode detector.

2. The method of claim 1, wherein one of the different radiation wavelengths is non-visible radiation.

3. A method for classifying an object from a plurality of objects, each of the plurality of objects having a surface area that is the total area of the exterior surfaces of the object, comprising the steps of:
    (a) coating at least 50% of the surface area of each object of the plurality of objects with barcodes, the barcodes are coated on each object over existing markings on the object and comprise a first barcode that is invisible and overlays a second barcode at least partially, the first and second barcodes are readable using a different radiation relative to each other, each radiation wavelength selected from a spectrum of wavelengths from radio waves to X-rays;
    (b) scanning the barcodes on each object of the plurality of objects with at least one corresponding barcode detector that is detectably compatible with a barcode of the type coated on the object;
    (c) determining whether one or more of the barcodes are read by the barcode detector; and
    (d) classifying the object as leaking when the first barcode on the object is not read by the corresponding barcode detector.

4. The method of claim 3 wherein the plurality of objects are packages containing wet pet food.

5. The method of claim 2 wherein each of the plurality of objects is classified in a binary fashion such that successful reading of the first barcode by the corresponding barcode detector is followed by classifying the particular object as type "A," failure of the corresponding barcode detector to read the first barcode is followed by classifying the particular object as type "B," the type "A" is leaking, and the type "B" is not leaking.

6. The method of claim 3 wherein another object is classified as desirable when the first barcode thereon is read by a corresponding barcode detector.

7. The method of claim 3 wherein the invisible barcodes fully coat the surface area of each object.

8. The method of claim 3 wherein the first barcode is a 1-D invisible barcode, a 2-D invisible barcode, a 3-D invisible barcode, or any combination thereof.

9. The method of claim 3 wherein the object is a product, device, container, label, or combinations thereof.

10. The method of claim 9 wherein the object is a can, bottle, pouch, box, bag, tray, tube, or sleeve.

11. The method of claim 3 wherein the radiation is visible radiation, infrared radiation, ultraviolet radiation, microwave radiation, or any combination thereof.

12. The method of claim 3, wherein one of the different radiation wavelengths is non-visible radiation.

13. A device for classifying an object from a plurality of objects, each of the plurality of objects having a surface area that is the total area of the exterior surfaces of the object, the device comprising:
    (a) a continuous production line for the plurality of objects;
    (b) barcode detectors attached to the continuous production line such that radiation from the barcode detectors is incident on at least one invisible barcode coated on at least 50% of the surface area of the object of the plurality of objects on the continuous production line, the barcode detectors comprise a first barcode detector and a second barcode detector that use a different radiation wavelength relative to each other, each radiation wavelength selected from a spectrum of wavelengths from radio waves to X-rays;
    (c) a component that classifies the object as leaking when the first barcode on the object is not read by the corresponding barcode detector; and
    (d) at least one of the following components:
    (i) a remover component configured to remove the object that is classified as leaking;
    (ii) an inspection component configured to inspect the object that is classified as leaking, for identifying a defect;
    (iii) a discarding component configured to discard the object of item (ii);
    (iv) a reprocessing component configured to reprocess the object of item (ii) into the continuous production line; and
    (v) a reinserting component configured to reinsert the object of item (ii) into the continuous production line.

14. The device of claim 13 suitable for classifying packages.

15. The device of claim 14 wherein the packages contain food.

16. The device of claim 15 wherein the food is a wet pet food.

17. The device of claim 13, wherein one of the different radiation wavelengths is non-visible radiation.

* * * * *